S. NEDBOR.
CONVERTIBLE SPRAY AND JET NOZZLE.
APPLICATION FILED AUG. 7, 1913.
1,128,178. Patented Feb. 9, 1915.
Fig. 1.
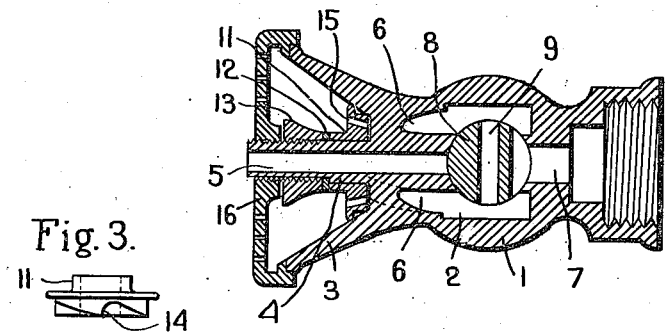
Fig. 3.
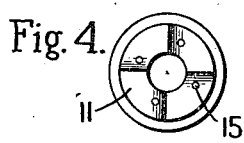
Fig. 4.
Fig. 2.
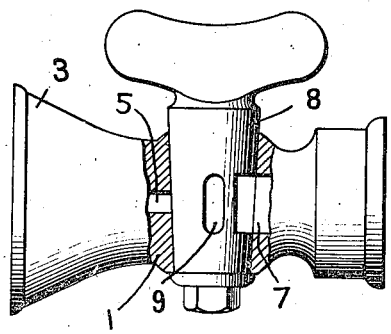
Fig. 5.
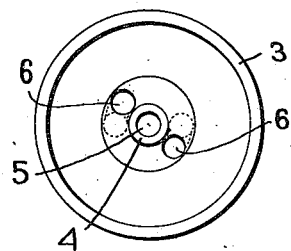
Witnesses.
J. Morrill Fuller
Joseph D. Ashe
Inventor.
Samuel Nedbor,
by Heard Smith & Tennant.
Atty's.

UNITED STATES PATENT OFFICE.

SAMUEL NEDBOR, OF SOMERVILLE, MASSACHUSETTS.

CONVERTIBLE SPRAY AND JET NOZZLE.

1,128,178.

Specification of Letters Patent.

Patented Feb. 9, 1915.

Application filed August 7, 1913. Serial No. 783,505.

*To all whom it may concern:*

Be it known that I, SAMUEL NEDBOR, a citizen of the United States, residing at Somerville, county of Middlesex, State of Massachusetts, have invented an Improvement in Convertible Spray and Jet Nozzles, of which the following description, in connection with the accompanying drawings, is a specification, like characters on the drawing representing like parts.

This invention relates to convertible spray and jet nozzles, and has for its object to provide a nozzle of this type, whereby an adjustable whirling spray may be provided.

Other objects will appear in the following specification in which the invention will be fully described.

Referring to the drawings in which my invention is illustrated, Figure 1 shows a longitudinal sectional view of my improved nozzle. Fig. 2 shows an elevation partly in section to show the valve. Fig. 3 is an elevation of the rotatable disk. Fig. 4 is a bottom plan view of Fig. 3, and Fig. 5 is an end view of the valve casing.

Referring to the drawings in detail 1 represents a valve casing having a valve chamber 2 and a bell shaped mouth 3. Centrally positioned in this mouth is a stem 4 and this stem is centrally bored as shown at 5 to provide an outlet port from the valve chamber through which a jet of water may be projected. Other outlet ports 6 in the form of helical passages are arranged around the stem and connecting the valve chamber with the bell shaped mouth. The valve casing is provided with an inlet port 7. In the valve chamber a valve 8 is rotatably mounted and this valve is provided with a straight passage 9 therethrough to connect the inlet 7 with the outlet 5. This valve is also slotted at one side as shown at 10 whereby the inlet port 7 may be connected with the outlet ports 6. By rotating the valve so that the slot 10 is diametrically opposite the inlet 7, the inlet may be entirely shut off so that no water may flow through the nozzle. Rotatably mounted on the stem 4 is a disk 11. This disk may slide upon the stem 4 as well as rotate thereon and its outward position is limited by a washer 12, splined to the stem, and a nut 13. This disk is provided with radial shoulders 14 which extend radially so as to lie at right angles to the passages 6 and receive the full force of the jets escaping therefrom, whereby the disk will be rotated. Holes 15 are provided in the disk 11 through which water may escape as the disk rotates providing a whirling spray. When the nut 13 is adjusted to hold the disk near its extreme position toward the valve casing, little or no water will escape between the edge of the disk and the bell shaped mouth; but when the nut is adjusted to allow the disk to be moved away from the nozzle a greater quantity of water will escape around the edge of the disk and in this manner the type of spray formed may be modified.

It is sometimes desirable to provide a rose spray instead of a whirling spray and for this purpose I provide a perforated cap 16 which may be secured to the stem 4 and fit tightly over the bell-shaped mouth. This cap is provided with a large number of perforations the total area of which is considerably less than the passages leading from the valve casing into the bell-shaped mouth so that there will be sufficient pressure to throw the spray with necessary force.

Having described my invention, what I claim as new and desire to secure by Letters Patent is,—

1. A nozzle comprising a casing having a bell shaped mouth, a valve chamber, a series of helically arranged passages between the valve chamber and the bell shaped mouth, a centrally bored stem centrally positioned in the bell shaped mouth, and an inlet connected with the valve chamber, a disk rotatably mounted on the stem and adjustable longitudinally thereof, said disk having shoulders on its inner side so positioned that fluid escaping from the passages will impinge against said shoulders to cause rotation of said disk, and holes adjacent said shoulders, through which fluid may escape during rotation of the disk to produce a whirling spray, adjustable means to limit the position of said disk, whereby the amount of spray escaping between the outer edge of said disk and the walls of the bell shaped mouth may be controlled, and a valve mounted in the valve casing and rotatable to connect the inlet with the bore of the stem or with the helically arranged passages.

2. A nozzle comprising a valve casing having a bell shaped mouth, a valve chamber provided with inlet and outlet ports, a stem centrally positioned in said bell shaped mouth, one of the outlet ports extending through said centrally positioned stem to produce a jet, other outlet ports being in the form of helical passages connecting the valve chamber with the bell shaped mouth, a disk rotatably mounted on the centrally positioned stem and adjustable longitudinally thereof so that it may fit more or less tightly in said bell shaped mouth, said disk having shoulders in its inner side so positioned that fluid escaping from the helical passages will impinge thereagainst to cause rotation of said disk, and holes adjacent the shoulders through which fluid may escape during the rotation of the disk to produce a whirling spray, and adjustable means to limit the position of said disk, whereby the amount of spray escaping between the outer edge of said disk and the wall of the bell shaped mouth may be controlled, a valve positioned in said valve chamber and rotatable to connect the inlet port with the outlet port which extends through the centrally positioned stem, or with the helically arranged passages, or to shut the inlet port off from all outlet ports, and a perforated cap adapted to be secured to the centrally positioned stem and fit over said bell shaped mouth.

In testimony whereof, I have signed my name to this specification, in the presence of two subscribing witnesses.

SAMUEL NEDBOR.

Witnesses:
ELIZABETH MORRIS,
MAURICE B. LANDERS.